United States Patent

[11] 3,628,011

| [72] | Inventor | Richard E. Wyman |
| | | Houston, Tex. |
| [21] | Appl. No. | 850,126 |
| [22] | Filed | Aug. 14, 1969 |
| [45] | Patented | Dec. 14, 1971 |
| [73] | Assignee | Shell Oil Company |
| | | Houston, Tex. |

[54] DETERMINING FORMATION PERMEABILITY BE MEANS OF REPEATED FLUID INJECTIONS AT DIFFERENT PRESSURES AND AFTER EACH INJECTION PRODUCING A NEUTRON ACTIVATION LOG
3 Claims, 2 Drawing Figs.

[52] U.S. Cl. ............................................. 250/43.5, 250/83.6, 250/106
[51] Int. Cl. ............................................. G01v 5/00
[50] Field of Search ................................. 250/43.5 MR, 106 L, 83.6 W

[56] References Cited
UNITED STATES PATENTS
2,443,680 6/1948 Herzog ..................... 250/106 L X
2,810,076 10/1957 Mardock ................... 250/106 L X
3,004,161 10/1961 Rickard .................... 250/43.5 MR X Primary Examiner—Archie R. Borchelt
Attorneys—J. H. McCarthy and Theodore E. Bieber ABSTRACT: A method for determining the permeability of a formation penetrated by a well using a neutron decay logging procedure. An aqueous liquid having a known neutron-capture cross section is first injected into the formation until the water saturation of the formation of interest is substantially 100 percent. Following the aqueous liquid, a viscous liquid having a known neutron-capture cross section which is different from the cross section of the aqueous liquid is injected at a low pressure. When equilibrium is reached, the concentration of the viscous liquid is measured using a neutron decay logging procedure. The injection of the viscous liquid is repeated using a higher pressure and the concentration of viscous liquid again measured. The injection pressure is increased in discrete steps and the concentration measured for each step until the fracturing pressure of the formation is approached. The concentration of viscous liquid versus injection pressure is plotted and used to determine the permeability of the formation.

INVENTOR:
R. E. WYMAN

DETERMINING FORMATION PERMEABILITY BE MEANS OF REPEATED FLUID INJECTIONS AT DIFFERENT PRESSURES AND AFTER EACH INJECTION PRODUCING A NEUTRON ACTIVATION LOG

CROSS REFERENCE TO RELATED APPLICATION

The present application is related to a copending application of J. E. Richardson and R. E. Wyman entitled "Method for Determining Residual Oil," Ser. No. 633,963, filed Apr. 26, 1967.

BACKGROUND OF THE INVENTION

The above copending application describes a method for using a neutron decay logging tool to determine the residual oil present in a formation. The logging tool measures a quantity related to the total capture cross section of the formation which is dependent upon the capture cross sections of the formation rock and of the fluids contained in the rock and upon their fractional abundances. Thus, generally, to interpret the measurements it is necessary to know the porosity and the capture cross sections of (a) the formation rock, (b) the water contained in the formation and (c) the oil contained in the formation. Normally the capture cross sections of the water and the formation oil respectively can be determined with a high degree of accuracy, while the capture cross section of formation rock cannot be determined with a high degree of accuracy, since it will be materially changed by small amounts of certain elements such as the rare earth elements or boron.

The method of the above-mentioned copending application determines the capture cross section of the formation rock by making two neutron decay log measurements with waters having known and materially different capture cross sections in the formation. The first measurement may be made with the original formation water in place, and the second measurement is made after replacing the formation water with a second aqueous liquid having a materially different neutron-capture cross section. From the two measurements, one can solve the resulting simultaneous equations and eliminate the term containing the capture cross section of the rock. The final result is independent of the cross section of the formation rock, and thus the water saturation, and thereby the residual oil, in place can be determined with a high degree of accuracy when the porosity is known or determined independently. Having determined the fractional amounts of oil and water and knowing their capture cross sections, one can use either of the prior log measurements and determine the capture cross section of the rock.

While the method disclosed in the copending application does provide an accurate measurement of the amount of residual oil remaining in the formation, it does not provide a measurement of the permeability of the formation. The permeability is important since it is a measure of the ability of a fluid to flow through the formation. One is not interested only in the amount of oil in a formation, but also in the likelihood that it can be produced from the formation. Normally, permeability is determined from laboratory measurements on core samples from a formation. Sometimes cores are not available and, even if cores are available, there is uncertainty about whether their properties have been changed by the act of coring or handling in the laboratory. Thus, the problem remains of ascertaining the in situ permeability.

SUMMARY OF THE INVENTION

The present invention solves the problem of obtaining accurate measurements of in situ permeability by utilizing the neutron decay logging system in a particular manner. More particularly, if the formation of interest is not already water saturated or at residual oil saturation, it is reduced to residual oil saturation by injecting an aqueous liquid having a known neutron-capture cross section. The capture cross section of the rock is then measure, preferably by using the method set forth in the above copending patent application. After the rock cross section is measured, a viscous liquid having a known neutron-capture cross section which is materially different from that of the aqueous liquid is injected to displace the aqueous liquid. Preferably, a viscous oil is injected at a relatively low pressure until an equilibrium between the oil and the water phases is reached. After equilibrium is reached, the pressure is measured and the fluid cross section is measured using a neutron decay log. The oil concentration can be determined from the fluid cross section since the cross sections of the two constituents, oil and water, are both known. The injecting step is then repeated using a higher pressure and the oil concentration again determined. This procedure is continued until an injection pressure approaching the fracture pressure of the formation is reached.

The oil concentration is plotted versus the injection pressure to obtain a curve related to the permeability of the formation. The permeability can be computed by means of the same equations as are used with laboratory measured curves.

The determination of oil saturation can be shown by means of the equations presented below. The neutron decay log measures the total capture cross section of the formation, $\Sigma_t$, where $$\Sigma_t = \Sigma_r(1-\Phi) + \Sigma_f \Phi$$

and $$\Sigma_f = \Sigma_w(1-S_o) + \Sigma_o S_o.$$

The symbols $\Sigma$, $\Phi$ and $S$ stand for cross section, fractional porosity and fractional saturation, respectively. The subscripts refer to the first letters in the variables total, rock, fluid, water and oil, respectively.

In the first equation, $\Sigma_r$ and $\Phi$ are known or determined; e.g., in the manner described in the copending application referenced above. Thus $\Sigma_f$ can be determined from a log measurement $\Sigma_t$. In the second equation, $\Sigma_w$ and $\Sigma_o$ are known, and therefore, the oil saturation, $S_o$, can be determined from the value for $\Sigma_f$.

The equations for determining permeability from the oil saturation versus injection pressure plot are varied depending upon the user. However, the particular equation used is not important here. It is only important that the present invention enables one to obtain the curve in situ instead of from laboratory measurements on cores.

BRIEF DESCRIPTION OF THE DRAWINGS

The above advantages and operation of this invention will be more easily understood from the following detailed description of a preferred embodiment when taken in conjunction with the attached drawings in which.

As explained above, the method of the present invention may utilize the logging method described in the above-referenced copending application. More particularly, the referenced method utilizes two separate measurements with the formation fluids varied to obtain two simultaneous equations. These simultaneous equations can then be solved without the necessity of knowing the capture cross section of the formation rock. Then utilizing the solution, one can compute the cross section of the rock.

The present invention can be practiced either in open boreholes or in cased boreholes providing the casing is perforated. The method of the present invention can be practiced by isolating the formation of interest as by means of packers set above and below the interval of interest. If the isolated formation is not already at 100 percent water saturation or at residual oil saturation, the formation waters are replaced with an aqueous liquid having a known neutron-capture cross section. A viscous liquid, preferably a crude, having a known neutron-capture cross section is next injected into the formation at a relatively low pressure. The injection is continued until equilibrium between the aqueous liquid in the formation and the injected crude is reached. When equilibrium is reached, the pressure is measured and the oil concentration in the formation is determined as described above.

The injection is repeated utilizing a higher pressure and continued until a new equilibrium between the aqueous phase and the crude is reached. Again the formation is logged to determine the oil concentration. This procedure is continued until a pressure approaching the fracture pressure of the formation is reached, at which point the injection is stopped. At each depth of interest the data obtained in the above process is plotted: the oil concentration plotted versus the injection pressure. From the plotted data one will obtain a curve which will indicate the approximate permeability of the formation. For example, a low permeability will be indicated by low-oil concentration at relatively high-injection pressure, while a high permeability will be indicated by high-oil concentration at relatively low-injection pressures.

Figure 1:
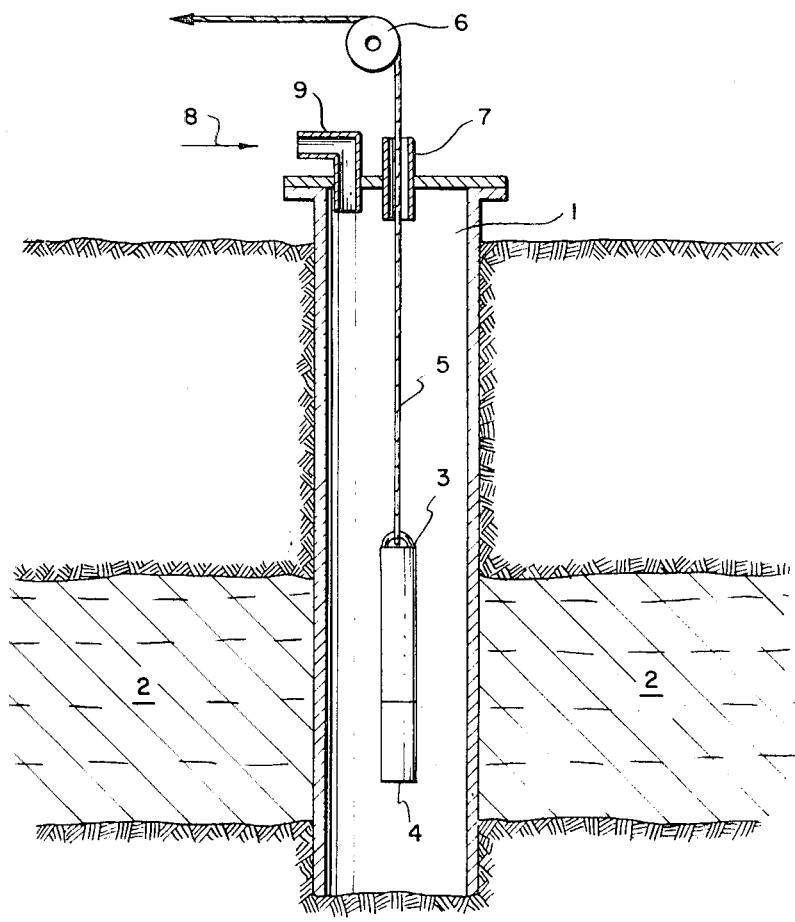
FIG. 1 is an illustration of a procedure for making the measurements.

A procedure for making the measurements is illustrated in FIG. 1. The borehole 1 has been drilled through the interval of interest 2. A neutron decay logging tool 3 and a pressure-measuring device 4 are lowered on the end of a logging cable 5. The logging cable passes through a lubricator 7, over a wheel 6 and then to a logging truck not shown. The logging cable contains conductors which carry electrical signals from the subsurface instruments to recorders in the logging trunk. The lubricator permits upward and downward motion of the logging cable while maintaining a positive pressure within the borehole. Injection of fluids, indicated by arrow 8, is made through tubing 9. The items described above may comprise equipment and techniques which are commercially available.

For simplicity, we have assumed in FIG. 1 that the interval of interest is the only permeable interval penetrated by the borehole. When several permeable intervals have been penetrated, the interval of interest can be isolated from all other intervals by one of several methods. For example, if the borehole is not cased, packers can set above and below the interval of interest. If the borehole is cased, perforation can be made in the interval of interest only. We will also assume that the porosity and the capture cross section of the rock have already been determined in some manner such as that described in the copending application referenced above.

If the interval of interest is not already at residual oil saturation or saturated with water having a known neutron-capture cross section, it is reduced to residual oil saturation by injecting an aqueous liquid having a known neutron-capture cross section. Next a viscous fluid, having a known neutron-capture cross section is injected at some low pressure through tubing 9 so as to pass down the borehole and enter interval 2. When the logging instruments (3, 4 or both) indicate that equilibrium has been reached between the fluids in borehole 1 and interval 2, the pressure is recorded from instrument 4 and the total capture cross section of the interval is recorded from instrument 3. The measurement with instrument 3 could be made with the tool stationary. However, it is preferred that one or more repeat passes be made over interval 2. First, this would give a profile of the injection from which permeability curves could be obtained at selected depths within interval 2. Secondly, repeat passes would increase the statistical accuracy of the measurements.

The injection pressure is then increased stepwise, and at each step, the procedure outlined above is repeated. The data obtained is plotted, oil concentration (or saturation) versus injection pressure, as illustrated in FIG. 2.

Figure 2:
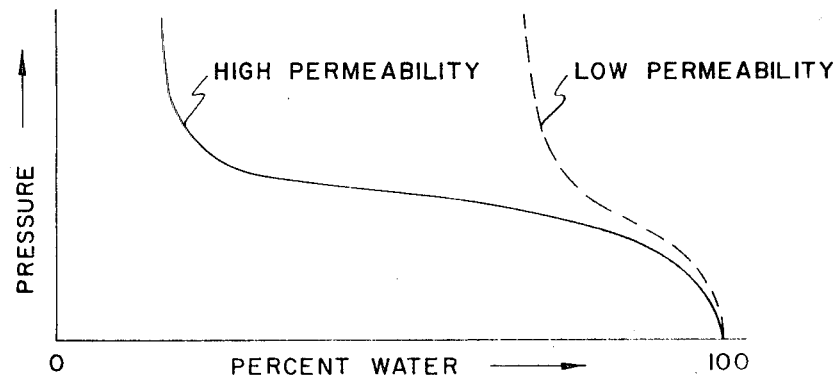
FIG. 2 is a plot of oil concentration versus injection pressure for formations having high and low permeabilities, respectively.

In FIG. 2, pressure is the ordinate and percent water is the abscissa. Percent oil is simply 100 minus percent water; i.e., 100 percent water corresponds to 0 percent oil and 0 percent water corresponds to 100 percent oil. The solid curve in FIG. 2 denotes a relatively high permeability while the dashed curve denotes a relatively low permeability. The interpretation of these curves is well known to those skilled in the art, but heretofore the data for plotting the curves could be obtained in the laboratory only.

In place of using crude petroleum as a viscous liquid for replacing aqueous liquid in the formation, other viscous liquids having known neutron-capture cross sections which are materially different from that of the aqueous liquid could also be used. In this case, the logging tool will measure the concentration of the viscous liquid in the formation and this data can be plotted with relation to the injection pressure. The plotted data can then be utilized in the manner described above to predict the approximate permeability of the formation to that particular fluid.

The number of individual injection steps employed in the invention can vary from only a few to many, depending upon the time available for collecting of the data. Three or four individual injection steps will normally provide sufficient data to predict the permeability of the formation. Of course, if greater accuracy is required, the number of individual injection steps must be increased.

To summarize, the invention consists of the following steps:

1. The porosity and the capture cross section of the rock are determined, e.g., as described in a copending application of J. E. Richardson and R. E. Wyman entitled "Method for Determining Residual Oil," Ser. No. 633,963, filed Apr. 26, 1967.

2. After the porosity and the rock cross section have been determined, one reduces the interval of interest to residual oil saturation by injecting an aqueous liquid having a known neutron-capture cross section, provided that the interval is not already known to be at 100 percent water saturation or at residual oil saturation and containing water having a known neutron-capture cross section.

3. After the interval is assured to be at 100 percent water saturation or at residual oil saturation and containing water having a known neutron-capture cross section, one injects a viscous liquid having a known neutron-capture cross section which is materially different from that of the aqueous liquid being displaced. This first injection of the viscous liquid is made at a selected, relatively low pressure and continued until an equilibrium is reached.

4. After the initial injection, the concentration of the viscous liquid in the formation is determined by means of a neutron decay log.

5. The injection is repeated utilizing a selected higher pressure and again continued until an equilibrium is reached. The concentration of the viscous liquid in the formation is again measured.

6. The above steps are repeated until an injection pressure approaching the fracture pressure of the formation is reached. At this point the injection is stopped and the concentration of the viscous liquid with relation to the injection pressure is plotted. From the plotted data one then determines the permeability of the formation.

I claim as my invention:

1. A method for determining the permeability of an earth formation penetrated by a well, said method comprising:

determining the porosity and the neutron-capture cross section of the rock of said formation;

injecting an aqueous liquid having a known neutron-capture cross section into said formation until the aqueous-liquid saturation is substantially 100 percent;

injecting a viscous liquid at a selected relatively low pressure into said formation for a period sufficient to establish an equilibrium between the amount of viscous liquid and aqueous liquid in said formation, said viscous liquid having a known neutron-capture cross section different from that of the aqueous liquid;

determining the oil concentration within said formation by irradiating said formation with neutrons and measuring the rate of neutron decay;

again injecting said viscous liquid into said formation at a selected higher injection pressure for a period sufficient to establish a new equilibrium between said viscous liquid and aqueous liquid;

redetermining the oil concentration within the formation;

repeating injection of said viscous liquid at at least one successively greater pressure and determining said oil concentration after each injection; and plotting oil concentration versus injection pressure to obtain a curve related to the permeability of said formation.

2. The process of claim 1 wherein said neutron-capture cross section is determined by measuring the difference between the rates of neutron capture when said formation is saturated with liquids of different and known neutron-capture cross sections.

3. The process of claim 1 wherein said viscous liquid is an oil.

* * * * *